Sept. 30, 1952  F. B. HALFORD ET AL  2,612,019
PROPELLENT INJECTION SYSTEM WITH SAFETY VALVE
TO CUT OFF FLUID PRESSURE SUPPLY
Filed Dec. 27, 1949
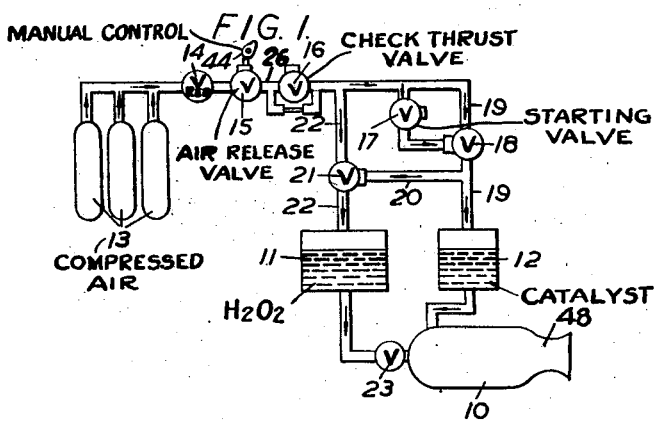
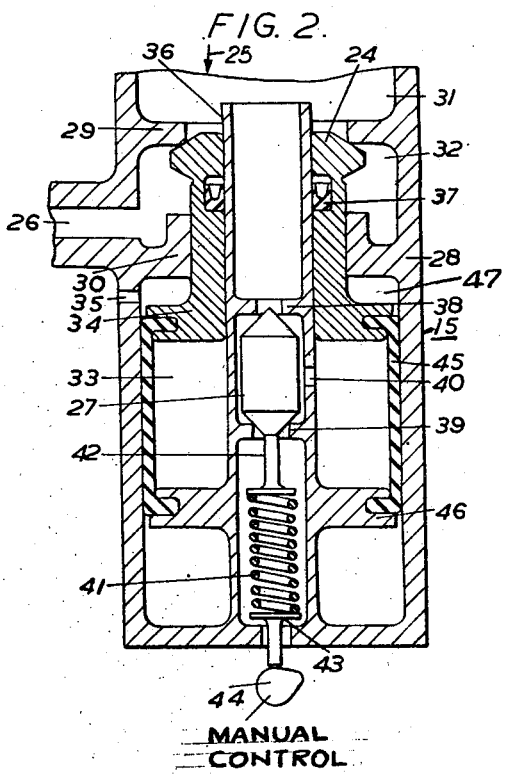
Inventors,
Frank B. Halford
Arthur V. Cleaver
Ernest B. Dove
By
Emery, Holcomb & Blair
Attorneys Patented Sept. 30, 1952

2,612,019

UNITED STATES PATENT OFFICE 2,612,019

PROPELLENT INJECTION SYSTEM WITH SAFETY VALVE TO CUT OFF FLUID PRESSURE SUPPLY

Frank Bernard Halford, Edgware, Arthur Valentine Cleaver, London, and Ernest Baker Dove, East Barnet, England, assignors to The De Havilland Engine Company Limited, Stonegrove, Edgware, England, a company of Great Britain Application December 27, 1949, Serial No. 135,285
In Great Britain January 3, 1949

5 Claims. (Cl. 60—35.5)

This invention relates to rocket type propulsion apparatus of the kind in which compressed air is employed to force propellent liquid or liquids from a reservoir or reservoirs into a reaction chamber, in which a reaction takes place accompanied by the evolution of gases which issue from a nozzle with propulsive effect.

The compressed air may, of course, be replaced by another compressed gas, but the term "compressed air" will be used for convenience as embracing either air or any other suitable gas.

In such rocket apparatus the compressed air generally passes through a number of valves on its way to the liquid reservoirs, for instance first through a reducing valve which reduces its pressure from the order of hundreds of atmospheres in a storage container to, say, tens of atmospheres in the rest of the apparatus, which will be termed the low pressure part. Distributor valves may be provided in the lower pressure part of the apparatus for distributing the compressed air to the various reservoirs for propellent liquids. A starting valve may also be provided for admitting the compressed air to the distributor valves and the parts of the apparatus beyond them when it is desired to bring the apparatus into operation. In the United States patent specification Serial No. 135,284, filed December 27, 1949, in the names of the present applicants it is also proposed to provide what is termed a check-thrust valve before the starting valve for the purpose of enabling the operator to ascertain whether the various parts of the apparatus are in working condition before setting it in full operation.

According to the present invention in a rocket type propulsion apparatus of the kind specified, and in which a reducing valve is provided, an air release valve is provided between the reducing valve and other valves in the apparatus, which can be opened to allow compressed air to pass through it to the rest of the low pressure part of the apparatus when the rocket is to be operated, but which is arranged to close automatically should the pressure in the low pressure part of the apparatus before the air release valve rise above a predetermined value.

Thus the air release valve serves as a safety device for ensuring that the other valves in the low pressure part of the apparatus cannot be subjected to an undesirably high air pressure, for instance in the event of the reducing valve failing to work correctly.

In order that it shall work in this manner the air release valve may include an actuating element which when the air pressure in the low pressure part of the apparatus is applied to it causes the valve to close, and a pilot valve arranged to allow air from the low pressure part of the apparatus to act on the actuating element when the pressure in the low pressure part of the apparatus before the air release valve exceeds a predetermined value. The pilot valve may conveniently be urged towards a seating by a spring in opposition to the pressure of the air in the low pressure part of the apparatus, and means may be provided for varying the loading of the spring. Thus when the air release valve is to remain closed the spring loading will be a minimum so that the air pressure can easily lift the pilot valve from its seating and act on the actuating element which holds the air release valve closed.

If now the air release valve is to be opened the spring loading is increased until the pilot valve is held on its seating. In moving on to its seating the pilot valve exposes the actuating element to the atmosphere allowing the pressure of the air in the apparatus to open the air release valve and to keep it open for so long as the pilot valve remains on its seat. If, however, the air pressure in the low pressure part of the apparatus before the air release valve should exceed a predetermined value, the spring force will be insufficient to hold the pilot valve on its seat so that it will lift and once more subject the actuating element to the pressure of the air in the apparatus. The main valve will therefore close and remain closed until such time as the pressure has fallen sufficiently to enable the pilot valve to resume its seat.

The construction of the valve may be varied considerably, but conveniently the actuating element is constituted by the piston of a pneumatic servo motor.

The invention may be carried into effect in various ways, but one particular arrangement will be described by way of example with reference to the accompanying drawing, as applied to a rocket unit intended for installation in or attachment to an aircraft for assisting its take off. In the drawing, Figure 1 is a diagram of the general arrangement of the rocket unit, and Figure 2 is a diagrammatic cross section of one form of air release valve.

The general arrangement and form of the rocket unit is described in United States specification Serial No. 135,282, filed December 27, 1949, in the names of Frank Bernard Halford and Arthur Valentine Cleaver. Broadly speaking, and as indicated in Figure 1, it consists of a reaction chamber 10 into which can be injected a main propellent, for instance hydrogen peroxide, from a reservoir 11, and a secondary propellent, for instance sodium or calcium permanganate which acts as a dissociation catalyst for hydrogen peroxide, from a reservoir 12. The liquids are injected by compressed gas, for instance, air, which is stored in bottles 13.

The compressed air passes through an automatic reducing valve 14 and then through the air release valve 15, shown in Fig. 2, which is the subject of the present invention and will be described in detail below. After leaving the air release valve the compressed air passes to a check thrust valve 16 and thence to a starting valve 17. Then this starting valve is opened compressed air passes through it and opens a catalyst air distributor valve 18, which allows compressed air to flow through a pipe 19 and enter the catalyst reservoir 12 and so inject the catalyst into the reaction chamber 10. A portion of the compressed air which has passed through the catalyst air distributor valve 18 flows along a pipe 20 and opens a hydrogen peroxide air distributor valve 21, thus allowing compressed air to flow through a pipe 22 and enter the hydrogen peroxide reservoir 11 and so inject hydrogen peroxide into the reaction chamber 10 through an automatic injector valve 23. The hydrogen peroxide thereupon dissociates producing propellent gases which issue through a reaction nozzle 48.

The air release valve 15, which is shown diagrammatically in Figure 2, consists of two valve members, namely a main valve member 24 which, when it is opened, allows compressed air to pass in the direction of the arrow 25 from the reducing valve 14 to an outlet passage 26, whence it goes to the check thrust valve 16. The second valve member comprises a pilot valve 27 which controls the movement of the main valve member 24.

The valve housing 28 is divided by transverse partitions 29 and 30 into three chambers. The upper chamber 31 communicates with the reducing valve 14, while the centre chamber 32 communicates with the outlet passage 26 and thence with the check thrust valve 16. The partition 29 between these chambers constitutes a seating for the main valve member 24, and when the main valve member is closed air cannot pass from the upper chamber 31 to the centre chamber 32. The third chamber 47 constitutes a cylinder in which can move a piston 34 connected to the main valve member 24, the part of the chamber 47 above the piston being vented at all times to the atmosphere through a port 35.

A tubular element 36 extends through the centre of the two lower chambers 32 and 47 and opens into the upper chamber 31. This tubular element accommodates the pilot valve 27. The main valve member 24 and the piston 34 can slide freely upon the tubular element 36, but a fluid seal 37 is provided to prevent leakage of air along the sliding surfaces. The pilot valve 27 consists of a double-ended needle valve which can move between two seats 38 and 39 formed in transverse partitions in the tubular element 36, so as to close one or the other. The aperture in the upper seat 38 is preferably slightly smaller than that in the lower seat 39. The space between these seats containing the pilot valve 27 communicates through a port 40 with a sealed chamber 47 below the piston 34. The interior of the tubular element 36 above the upper seat 38 communicates with the chamber 31, while the interior of the tubular element 36 below the lower seat 39 communicates with the atmosphere. The latter part of the tubular element also contains a compression spring 41 which bears against the pilot valve 27 through a stem 42, and tends to hold it against its upper seat 38.

At the lower end of the spring 41 there is a movable abutment 43 which can be raised or lowered by means of a cam 44 under the control of the air craft pilot for varying the loading of the spring.

The chamber 47 is sealed by a fluid seal 45 of the bellows type. One end of this seal engages the periphery of the piston 34 while the other end engages the periphery of a flange 46 which extends from the tubular element 36.

When the spring 41 is heavily loaded, the pilot valve 27 generally occupies its upper position engaging the seat 38 so that the chamber 33 beneath the piston 34 will be maintained in communication with the atmosphere through the seat 39 and the port 40. The pressure of the compressed air on the main valve member 24 thus moves it from its seating in the partition 29, so that compressed air can flow without hindrance from the reducing valve 14 to the check thrust valve 16. On the other hand when the loading of the spring 41 is eased until the pilot valve 27 assumes its lower position on the seat 39, compressed air enters the chamber 33 beneath the piston 34 through the seat 38 and the port 40, and so raises the piston 34 and forces the main valve member 24 on to its seat, thus cutting off the supply of compressed air to the check thrust valve, and to the rest of the low pressure part of the rocket unit.

If, however, the spring 41 is heavily loaded so that the main valve member 24 should be open, but the pressure of the compressed air is excessive, this pressure will nevertheless force the pilot valve 27 from its upper seat 38 against the action of the spring 41. The pilot valve will thus admit compressed air to the chamber 33 below the piston 34 and hold the main valve member 24 firmly on to its seating. Thus should there ever be an excessive pressure beyond the reducing valve 14, for instance in the event of a failure of that valve, the air release valve 15 will prevent this excessive pressure from reaching the rest of the low pressure part of the rocket unit.

What we claim as our invention and desire to secure by Letters Patent is:

1. Rocket propulsion apparatus consisting of a high pressure part comprising at least one storage container for gaseous pressure medium and a pressure-reducing valve adapted to reduce the pressure of the gaseous medium issuing from said storage container, and a low pressure part consisting of the part beyond said pressure-reducing valve and comprising at least one reservoir for propellent liquid, a reaction chamber, a propulsion nozzle extending rearwardly from said reaction chamber, control means for admitting gaseous pressure medium to said reservoir to pressurize said reservoir and inject propellent liquid into the reaction chamber for gas-producing reaction therein, and a release valve situated between said pressure-reducing valve and the rest of the low pressure part of the apparatus, said release valve comprising a closure member, actuating means for said closure member, and a pressure-responsive element communicating with the low pressure part of the apparatus upstream of said closure member and controlling said actuating means, whereby said closure member is fully open when the pressure acting on said pressure-responsive element is below a predetermined value and is fully closed when said pressure is above said predetermined value.

2. Rocket propulsion apparatus as claimed in claim 1, which also includes overriding control means for said release valve whereby the closure member thereof can be closed irrespective of the pressure in the low pressure part of the apparatus.

3. Rocket propulsion apparatus, as claimed in claim 1, in which the actuating means for the closure member of the release valve is pressure actuated and is arranged to close said closure member when pressure is applied thereto and said pressure responsive element comprises a pilot valve which is moved to admit pressure medium to said actuating means when the pressure in the low pressure part of the apparatus exceeds said predetermined value.

4. Rocket propulsion apparatus, as claimed in claim 3, in which the actuating means for the closure member of the release valve comprises a piston of a piston and cylinder type pneumatic servomotor, said pilot valve constitutes the control valve of said servomotor and the gaseous pressure medium in the low pressure part of the apparatus constitutes the pneumatic working medium of said servomotor.

5. Rocket propulsion apparatus as claimed in claim 3, which includes a seating for said pilot valve, a spring adapted to urge said pilot valve on to said seating in opposition to the pressure of the gaseous pressure medium in the low pressure part of the apparatus before the release valve, and an adjustable abutment for said spring.

FRANK BERNARD HALFORD.
ARTHUR VALENTINE CLEAVER.
ERNEST BAKER DOVE.

REFERENCES CITED

The following references are of record in the file of this patent:

UNITED STATES PATENTS

| Number | Name | Date |
|---|---|---|
| 670,563 | Morris | Mar. 26, 1901 |
| 1,162,383 | Neal | Nov. 30, 1915 |
| 2,192,042 | Hoffmann | Feb. 27, 1940 |
| 2,225,916 | Maglott | Dec. 24, 1940 |
| 2,370,110 | Spence | Feb. 20, 1945 |
| 2,384,669 | Fields | Sept. 11, 1945 |
| 2,398,201 | Young | Apr. 9, 1946 |
| 2,406,926 | Summerfield | Sept. 3, 1946 |
| 2,505,798 | Skinner | May 2, 1950 |

OTHER REFERENCES

Journal of the American Rocket Society, No. 72, Dec. 1947, pages 47 and 48.